Dec. 25, 1934.  H. H. WOLF  1,985,477
INDEXING DEVICE
Filed May 19, 1934  3 Sheets-Sheet 1
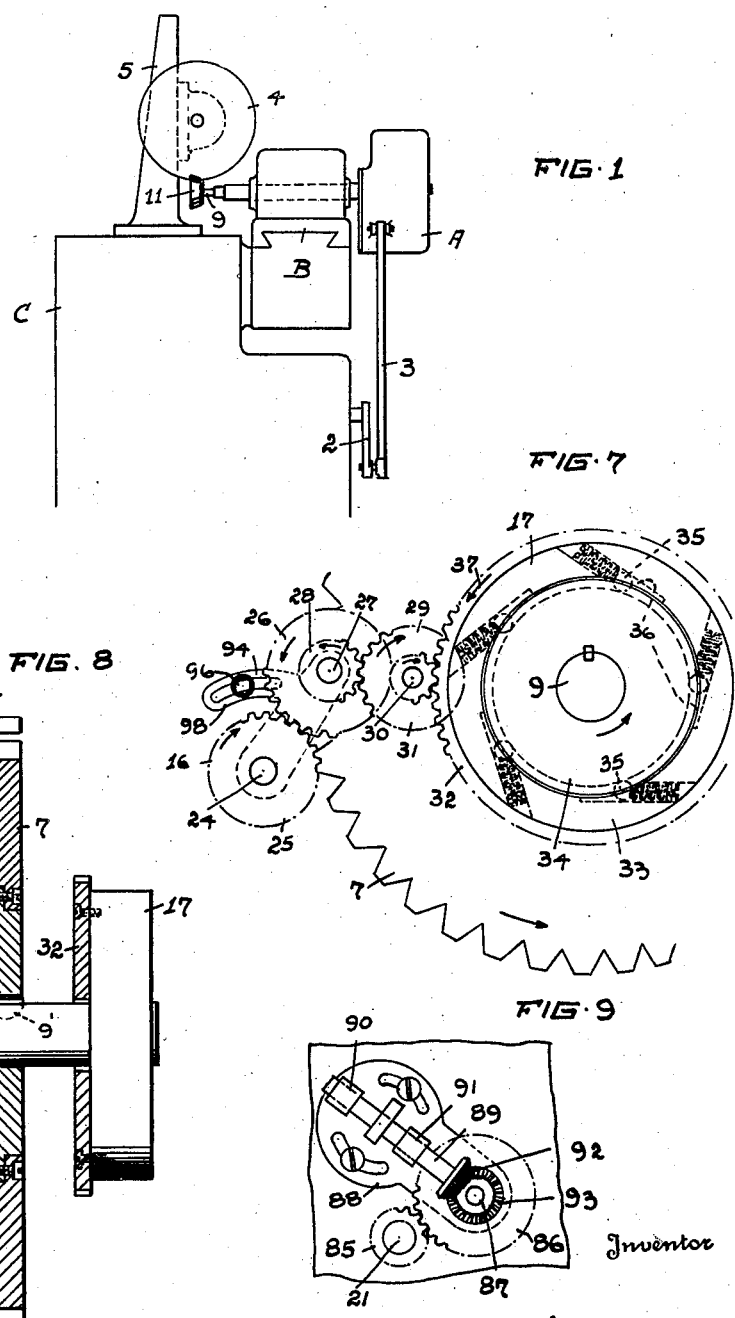
Inventor
Henry H. Wolf
By Fisher, Moore & Moore
Attorneys

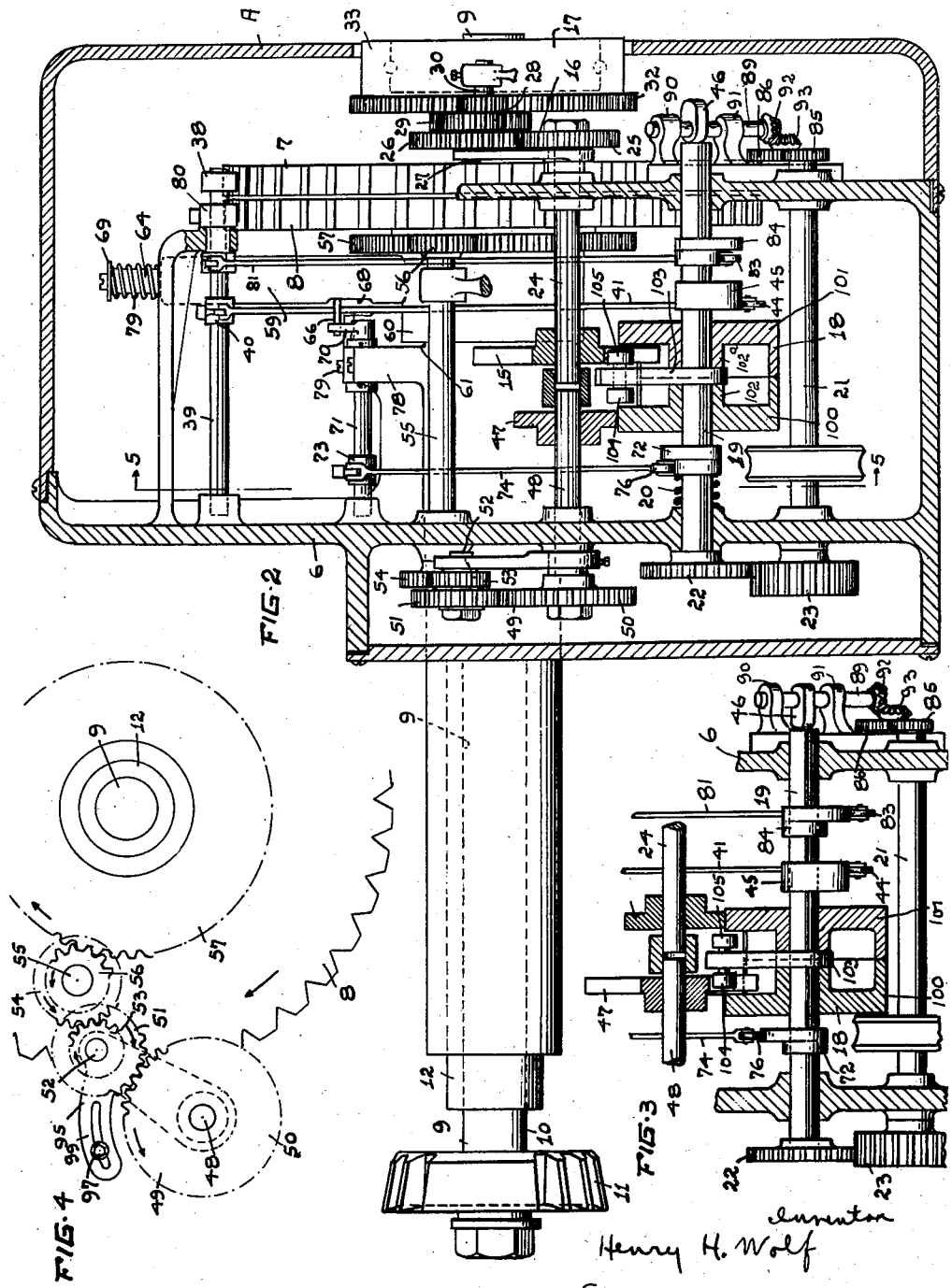

Dec. 25, 1934.   H. H. WOLF   1,985,477
INDEXING DEVICE
Filed May 19, 1934   3 Sheets-Sheet 3
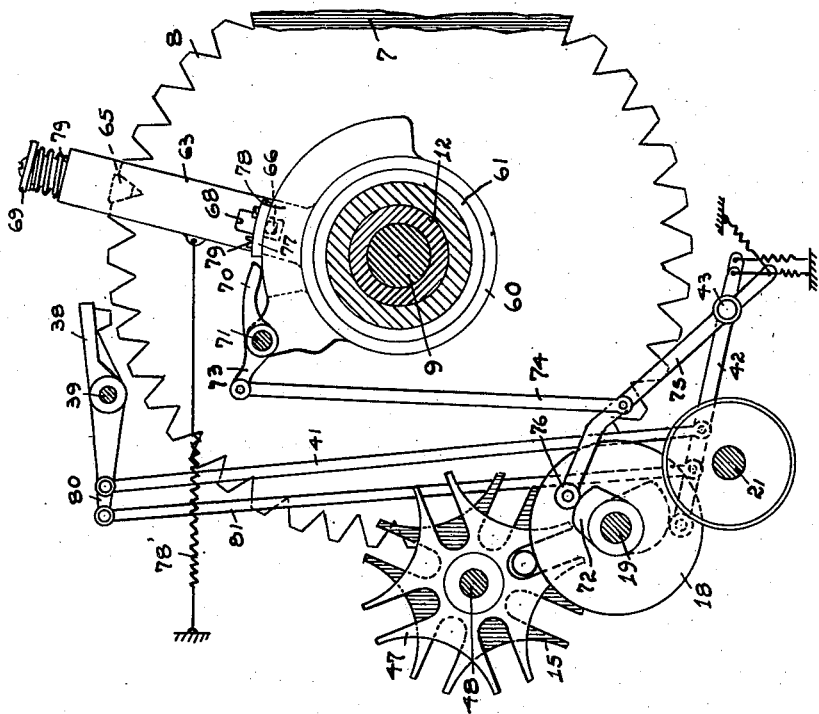

UNITED STATES PATENT OFFICE 1,985,477

INDEXING DEVICE

Henry H. Wolf, Cleveland, Ohio

Application May 19, 1934, Serial No. 726,428

14 Claims. (Cl. 51—216)

My invention relates to an indexing device suitable for use with grinding machines and is especially applicable in gear, gear shaper cutter and intermittent gear shaper cutter grinding machines of that character in which there is a grinding wheel, a work support, means for causing a reciprocatory movement of the work support toward the grinding wheel in performing the grinding, and indexing means for intermittently presenting new surfaces of the work to the grinding wheel. The indexing means in these grinding machines index the work piece, step by step, or tooth by tooth, to feed consecutive teeth of the work piece to the grinding wheel but they do not permit spaces between the groups of teeth being indexed, such as are present in gear cutters or intermittent gears. At present these intermediate spaces are ground by manually resetting the grinding machine after each grinding of a group of teeth.

It is the general object of my invention to do away with the disadvantages encountered in resetting of gear grinding machines during grinding operations on intermittent gear shaper cutters and intermittent gears in order to obtain an exact working of the machine in an entirely automatic way.

Another object of my invention is to provide an improved indexing mechanism for use in grinding the teeth of intermittent gears, gear cutters and the like, and for other similar purpose in which a high degree of accuracy is required.

Still another object of my invention is to provide an improved indexing mechanism for use in grinding the teeth of gears, intermittent gears, gear cutters and the like which mechanism can readily be adjusted for grinding gears and gear cutters of any pitch diameter and of any spacing between the groups of teeth in intermittent gears and gear cutters, by merely changing the gears in the indexing mechanism.

Other objects and advantages of my invention will be readily understood from the following description and claims, and from the drawings, in which:

Figure 1 is a diagrammatic showing of a gear grinding machine embodying the invention;

Figure 2 is a transversal sectional view through a complete indexing device constructed in accordance with the invention showing the Geneva drive mechanism coupled with the indexing plate, which controls the step by step rotation of the work piece;

Figure 3 is a fragmentary sectional view similar to Figure 2 showing the Geneva drive mechanism laterally shifted for coupling with the other indexing plate;

Figure 4 is a diagrammatic view of the gear train for coupling the fast rotating indexing plate with its Geneva drive mechanism;

Figure 5 is a sectional view on line 5—5 of Figure 2 showing the ratchet mechanism for the two indexing plates and the coupling means for coupling the two plates for joint rotation;

Figure 6 is a sectional view similar to Figure 5 with the exception that the Geneva drive mechanism is coupled with the fast rotating indexing plate, in which position the coupling means for the two plates are in operation;

Figure 7 is a diagrammatic view of the gear train, coupling the indexing plate for controlling slow, step by step rotation with the Geneva drive mechanism;

Figure 8 is a sectional view on line 8—8 of Figure 5; and

Figure 9 is a fragmentary side view of the mechanism effecting lateral shifting of the Geneva drive mechanism.

In applying the invention to machines for grinding the teeth of gears, intermittent gears, gear cutters and other like purposes, I mount an indexing and work supporting unit A, upon the slide B, of a gear cutting machine C, and oscillate and reciprocate the unit by means of a driven crank 2, hinge rod 3 and other mechanism, not shown, toward and away from a driven grinding wheel 4 which is adjustably mounted on a standard 5, all as well known and generally practiced in the art, see Figure 1. The indexing unit A carries in its chambered body 6, two toothed indexing plates or disks 7 and 8, axially aligned with a spindle 9, which spindle supports at its outwardly exposed left end 10 a gear cutter 11. The indexing plate 7 is rigidly secured to spindle 9, by a key 9', whereas the toothed indexing plate 8 is carried by an adapter 14, integrally formed with an elongated tubular member 12, in turn sleeved for rotation upon and guided by said spindle. Spindle 9, and therewith indexing plate 7, are coupled with a Geneva wheel 15 by means of a chain of gearing 16 and a coupling member 17. This Geneva wheel is mounted on a short shaft 24 and is actuated by a crank member 18, mounted on a laterally shiftable shaft 19, when this shaft is moved toward the right by the pressure of a compression spring 20. The shaft 19 is coupled with a main drive shaft 21 by means of meshing gears 22, 23, the gear 23 of which is substantially wider than gear 22 to accommodate the lateral movements of shaft 19, as will later be described.

Actuation of the Geneva wheel 15 by the crank member 18, causes intermittent movement of the short shaft 24, which movement is transmitted over gearing 16 and coupling member 17 to spindle 9 as follows: Shaft 24 carries at its right end a gear 25 which meshes a gear 26 on an adjustably mounted stud shaft 27. This gear 26 has a gear 28 rigidly connected therewith, which meshes with a gear 29 on a shaft 30, and the gear 29 in turn is integrally formed with a gear 31, which meshes with a gear 32. The gear 32 is attached to the outer ring 33 of the coupling member 17, which in effect constitutes a one way clutch member, embodying the said outer ring 33, an inner coupling disk 34 rigidly connected to spindle 9, and spring pressed balls 35, arranged within wedge-shaped slots 36, for rigidly coupling the outer ring to the inner disk when rotated in the direction of arrow 37. Consequently intermittent rotation of shaft 24, by the Geneva wheel 15, in the direction of the arrows as shown in Figure 7, causes intermittent or indexing movement of spindle 9 and indexing plate 7. The movement of spindle 9 and indexing plate 7 is checked by a ratchet pawl 38, rigidly connected to a rotatable shaft 39, adapted to be oscillated by a lever 40. This lever 40 is connected by means of a link 41 with a lever 42, and the latter which is pivotally mounted on a shaft 43, carries at its free end a roller 44 in rolling engagement with a cam 45 on shaft 19. It will be seen that during each rotation of the shaft 19 the pawl 38 is raised and lowered and while permitting proper indexing of the spindle prohibits undesirable movement during grinding operations.

When the shaft 19 is shifted toward the left by means of a properly timed cam member 46, as will be later described, the crank member 18 disengages the Geneva wheel 15 and engages a second Geneva wheel 47, mounted on a short shaft 48. This shaft 48 is coupled with indexing plate 8 by means of a gearing 49. Thus the shaft 48 carries at its left end a gear 50, which meshes with a gear 51 on an adjustably mounted stud shaft 52. This gear 51 has rigidly secured thereto a gear 53, which meshes with a gear 54 secured to a shaft 55 and this shaft 55 in turn carries at its other end a gear 56, meshing a gear 57 secured to indexing plate 8, by means of screws 58. The intermittent movement of the Geneva wheel 47 will therefore be transmitted to indexing plate 8, which latter as previously brought out, is freely rotatable on spindle 9, and the movement of indexing plate 8 is then transmitted to spindle 9 by means of a coupling device 59, adapted to couple indexing plate 8, with indexing plate 7. This coupling device 59 embodies a sleeve member 60, rotatably mounted on a cylindrical bearing portion 61 of chambered body 6, the portion 61 being arranged in axial alignment with respect to spindle 9 and tubular member 12, roller bearings 62 being employed to insure free rotation of sleeve member 60 on portion 61. The sleeve member 60 is formed with a cylindrical hollow extension 63, which slidably supports a plunger 64, provided with an upper coupling finger 65 and a lower finger portion 66, all of which protrude through slots 67, 68 respectively in the wall of extension 63. When this plunger is shifted downwardly against the force of a spring 79, seated against the top of extension 63 and a washer 69 on plunger 64, the coupling finger 65 enters into the recesses of the indexing plates 7 and 8 and secures these plates together for joint movement, so that the intermittent movement of plate 8 is communicated to plate 7 and spindle 9. The coupling device 59 is controlled by means of a lever 70, secured to an oscillating shaft 71, a cam 72 on shaft 19, a lever 73, and a link 74 coupled with a lever 75 on shaft 43. The lever 75 carries at its free end a roller 76 in rolling engagement with the cam 72 on shaft 19. When the shaft 71 is oscillated the lever 70 engages the finger portion 66 and forces the plunger 64 and the coupling finger 65 downwardly to couple the indexing plates 7 and 8 with each other. Consequently the rotation of indexing plate 8 is transmitted to the coupling device 59, and the finger portion 66 on plunger 64 is brought into riding contact with the inner surface of an interchangeable coupling flange 77, which flange is secured to a hub shaped extension 78 of the cylindrical bearing portion 61, screws 79 being employed to secure the flange in place. After the finger portion 66 passes beyond the end of flange 77, the coupling of the two indexing plates 7 and 8 is automatically released, and the coupling device is automatically returned to its proper working position by a spring such as diagrammatically indicated at 78'. A pawl 80 checks the movement of indexing plate 8. This pawl is coupled by a link 81 with a lever 82, which is also pivotally mounted on the shaft 43 and carries at its free end a roller 83, in rolling engagement with a cam 84 on shaft 19.

The lateral movement or oscillation of the shaft 19 which effects coupling and uncoupling of the crank member 18, as previously described, is controlled by the cam member 46 and compression spring 20. This cam member is automatically timed by means of the main drive shaft 21, which carries at its right end a gear 85, in mesh with a gear 86 on a stub shaft 87. This shaft is in turn mounted on a bracket 88, which is adjustably bolted to one wall of the chambered body 6 and carries a short shaft 89 rotatably supported in bearings 90, 91. Shaft 89 mounts the cam 46 and is coupled to main shaft 21 by means of a bevel gear 92 and a bevel gear 93, secured to gear 86. The operation of the indexing unit is essentially as follows:

Assuming the shaft 19 is in its right hand position, as illustrated in Figure 2, the crank member 18 will operate the Geneva wheel 15 and thereby, as previously brought out, effect a step by step rotation of the spindle 9 and indexing plate 7. However, when the cam 46 causes the shaft 19 to be shifted towards the left then the crank member 18 will engage the Geneva wheel 47 and cause rotation of indexing plate 8. In this latter position of shaft 19 the coupling device 59 is actuated by cam 72 and therefore indexing plate 7 is rotated jointly with indexing plate 8, until the coupling device is released when finger portion 66 engages the coupling flange 77.

In order to properly time the unit for grinding, gear cutters of different size and different diameter, it is merely necessary to interchange the gears 85 and 86, the gears 26, 28, the gears 51 and 53 and the flange 77. To facilitate interchange of the gears 26, 28 and 51, 53, these gears are mounted on brackets 94, 95 respectively. These brackets are pivoted to the chambered body 6, in axial alignment with shafts 24 and 48 and are secured in place by means of set screws 96, 97, extending through slotted arms 98, 99 integrally formed on the respective brackets.

The crank member 18 preferably embodies a lever 103 which is gripped by the inner hub portions 102, 102ª of oppositely arranged flanged circular disks 100 and 101. This lever is extended through cut out portions in the flanges of said disks and carries at its exposed end rollers 104 and 105 for engagement with the slots 106 of the respective Geneva wheels 15 and 47. The circular peripheries of the disks, when in proper position, lock the respective Geneva wheels against rotation provided these wheels are not in engagement with one of the rollers 104 or 105 of lever 103, this action being identical with that of the Geneva stop.

When intermittent gear cutters are to be ground, the indexing and work supporting unit A is fitted for the particular type of cutter by proper choice of the gears 85, 86, 26, 28, 51, 53 and the flange 77 and then the work piece or gear cutter 11 is mounted on spindle 9 in such a position that the first tooth of a group of teeth of said cutter is actuated upon by the grinding wheel right after shifting of shaft 19 to its right hand position.

Assuming now that the unit is in the above described position and the gear cutting machine C is started, then the rotation of shaft 21, causes rotation of the shaft 19 and therewith intermittent rotation of shaft 24 by means of the lever 103 and Geneva wheel 15. The shaft 24 by means of the chain of gears 16 (see Figure 7) causes rotation of outer ring 33 of the one way clutch member 17 in the direction of arrow 37 so that this clutch member couples the gear 32 of said chain of gears with the spindle 9 and imparts the movement of shaft 24 to the work piece 11. At the same time the cam member 45 on shaft 19 raises the ratchet pawl 38 out of engagement with the indexing plate 7, to permit of the desired movement of said spindle.

The described indexing movement causes a tooth by tooth advancement of spindle 9 and the cutter 11 mounted therein until the cam 46, the supporting shaft 89 of which is in driving connection with the shaft 21, shifts the shaft 19 to its left hand position. Then the rotary movement of the shaft 21 is transmitted to the shaft 48 by means of the lever 103 and the Geneva wheel 47. This shaft 48 transmits its intermittent movement by means of gearing 49 to the tubular member 12, which supports the indexing plate 8 and is then transmitted to spindle 9 by means of coupling device 59, adapted to couple indexing plate 8 with indexing plate 7. The cam 72 on shaft 19 actuates said coupling device which by means of its upper coupling finger 65 couples the two disks 7 and 8 together and is held in coupling position by the finger portion 66 cooperating with the coupling flange 77. The spindle is therefore now indexed until the coupling device 59 is disengaged. During this indexing movement the ratchet pawls 38 and 80 are disengaged by cams 45 and 84 and permit of the desired movement of the spindle 9. The indexing movement by the shaft 48 is effected during a single rotation of shaft 19 and is greater than the tooth by tooth advancement obtained by shaft 24 because gearing 49 effects a more rapid movement of spindle 9 than the chain of gears 16. At the end of rotation of the shaft 48 the clutch device is returned to its starting position and the shaft 19 is shifted by the spring 20 back to its right hand position ready for repetition of the described indexing cycle.

Although I have illustrated and described only one form of the invention I am aware of the fact that modifications can be made therein by any person skilled in the art without departing from the scope of the invention as expressed in the claims. Therefore I do not wish to be limited in this respect.

Having thus described my invention, what I claim is:

1. In indexing mechanism for gear grinding and other machines the combination of a work supporting spindle, an indexing plate rigidly connected to said spindle, intermittent drive means including a one way clutch for rotating said spindle and indexing plate step by step, a second indexing plate, freely rotatably mounted with respect to said spindle, intermittent drive means for rotating said second indexing plate, and timed coupling means for coupling said two indexing plates with each other, when said second indexing plate is rotated.

2. In indexing mechanism for gear grinding and other machines the combination of a work supporting spindle, an indexing plate rigidly connected to said spindle, intermittent drive means including a one way clutch for rotating said spindle and indexing plate step by step, a second indexing plate freely rotatably mounted in axial alignment with respect to said spindle, intermittent drive means for rotating said second indexing plate, timed coupling means for coupling said two indexing plates with each other when said second indexing plate is rotated, and means for selectively actuating either one of said intermittent drive means.

3. In indexing mechanism for gear cutter grinding and other machines the combination of a work supporting spindle, an indexing plate rigidly connected to said spindle, drive means including a one way clutch for rotating said spindle step by step the width of a tooth of the gear cutter to be ground, a second indexing plate freely rotatably mounted in axial alignment with respect to said spindle, drive means for rotating said second indexing plate, timed coupling means for automatically coupling said two indexing plates with each other when said second indexing plate is rotated for rotating said spindle more than the width of a tooth of the gear cutter to be ground, and means for automatically actuating one or the other of said drive means to effect either step by step rotation of said spindle.

4. In indexing mechanism for gear cutter grinding and other machines the combination of a work supporting spindle, an indexing plate rigidly connected to said spindle, drive means including automatically actuated clutching means for rotating said spindle step by step the width of a tooth of the gear cutter to be ground, a second indexing plate freely rotatably mounted in axial alignment with respect to said spindle, drive means for rotating said second indexing plate, timed coupling means for automatically coupling said two indexing plates with each other when said second indexing plate is rotated for turning said first indexing plate a distance greater than the width of a tooth of the gear cutter to be ground, and means for automatically actuating one or the other of said drive means to effect either step by step rotation of said spindle, said drive means for said second indexing plate being geared up with respect to the drive means for said first spindle and first indexing plate.

5. In indexing mechanism for gear shaper cutter grinding and other machines the combination of a work supporting spindle, means for indexing said spindle step by step and more than one step, two independent drive means for said indexing means and a single means for selectively actuating either one of said independent drive means.

6. In indexing mechanism for gear shaper cutter grinding and other machines the combination of a work supporting spindle, means for indexing said spindle step by step and more than one step, drive means for each of said indexing means and a single axially shiftable means for selectively actuating either one of said drive means.

7. In indexing mechanism for gear shaper cutter grinding and other machines the combination of a work supporting spindle, means for indexing said spindle step by step and more than one step including gearing for rotating said spindle at different speeds, a Geneva drive for each of said indexing means for intermittent indexing movement thereof, said two Geneva drives embodying a single means adapted to be coupled with either one of said two Geneva drives for actuating same and means for automatically controlling the coupling of said single means with either one of said Geneva drives.

8. In indexing mechanism for gear shaper cutter grinding and other machines the combination of a work supporting spindle, means for indexing said spindle step by step and more than one step including gearing for rotating said spindle at different speeds, a Geneva drive for each of said indexing means for intermittent indexing movement thereof, said two Geneva drives embodying a single drive means mounted on an axially shiftable shaft and adapted to be coupled with either one of said two Geneva drives for actuating same and means for axially shifting said shaft for controlling the actuation of said Geneva drives, said shifting means being automatically controlled when said machine is in operation.

9. In indexing mechanism for gear shaper cutter grinding and other machines the combination of a work supporting spindle, means including an indexing plate, rigidly coupled with said spindle for step by step rotation of said spindle, means including a second indexing plate freely rotatably supported with respect to said spindle for more than one step rotation of said spindle, coupling means for coupling said two indexing plates when said second indexing plate is operated, and axially shiftable controlling means for automatically actuating said coupling means.

10. In indexing mechanism for gear shaper cutter grinding and other machines as described in claim 9, ratchet mechanism for each of said indexing plates for rigidly holding said plates and spindle against rotation when not indexing.

11. In indexing mechanism for gear shaper cutter grinding and other machines, the combination of a work supporting spindle, means for indexing said spindle step by step including a Geneva drive mechanism and an indexing plate rigidly coupled with said spindle, means for indexing said spindle more than one step including a second Geneva drive mechanism and a second indexing plate freely rotatably supported with respect to said spindle, said two Geneva drive mechanisms being axially aligned with each other and including a single drive means adapted to actuate either one of said Geneva drives while locking the other one.

12. In indexing mechanism for gear shaper cutter grinding and other machines the combination of a work supporting spindle, means for indexing said spindle step by step including a Geneva drive mechanism and an indexing plate adapted to be intermittently driven by said drive mechanism, means for indexing said spindle more than one step including a second Geneva drive mechanism and a second indexing plate, freely rotatably supported with respect to said spindle, said two Geneva drive mechanisms being axially aligned with each other and including drive means adapted to actuate either one of said Geneva drives while locking the other one, a shaft supporting said drive means, and means for axially shifting said shaft to effect coupling of said drive means with either one of said Geneva drives.

13. In indexing mechanism for gear shaper cutter grinding and other machines as described in claim 12, coupling means adapted to couple the two indexing plates together for joint indexing movement, and means on said axially shiftable shaft for actuating said coupling means, when said drive means engage the Geneva drive which forms a part of the means for indexing said spindle more than one step.

14. In indexing mechanism for gear shaper cutter grinding and other machines as described in claim 11, wherein said single drive means includes locking means at its opposite sides for locking either one of the Geneva wheels of said Geneva drives and an operating member arranged between said locking means, said operating member being provided with coupling rollers at the opposite sides of one end of said member to facilitate coupling of said member with either one of the Geneva wheels of said Geneva drives.

HENRY H. WOLF.